(12) United States Patent
Bhatt

(10) Patent No.: US 10,878,534 B2
(45) Date of Patent: Dec. 29, 2020

(54) APPARATUSES, PROCESSES, AND COMPUTER PROGRAM PRODUCTS FOR IMAGE DATA DOWNSCALING

(71) Applicant: KYOCERA Document Solutions Inc., Osaka (JP)

(72) Inventor: Jayant Bhatt, Torrance, CA (US)

(73) Assignee: KYOCERA Document Solutions Inc.

( * ) Notice: Subject to any disclaimer, the term of this patent is extended or adjusted under 35 U.S.C. 154(b) by 133 days.

(21) Appl. No.: 16/183,602

(22) Filed: Nov. 7, 2018

(65) Prior Publication Data

US 2020/0143513 A1    May 7, 2020

(51) Int. Cl.
    *G06T 3/40*    (2006.01)
(52) U.S. Cl.
    CPC .................... *G06T 3/4023* (2013.01)
(58) Field of Classification Search
    CPC .................................................. G06T 3/4023
    USPC ........................................................ 358/1.2
    See application file for complete search history.

(56) References Cited

U.S. PATENT DOCUMENTS

| | | | | | |
|---|---|---|---|---|---|
| 5,263,136 A | * | 11/1993 | DeAguiar | ........... | G06F 12/0875 345/538 |
| 5,768,629 A | * | 6/1998 | Wise | ....................... | G06F 13/28 710/68 |

* cited by examiner

*Primary Examiner* — Mohammad H Ghayour
*Assistant Examiner* — Darryl V Dottin
(74) *Attorney, Agent, or Firm* — Law Office Of Alexis J Saenz

(57) ABSTRACT

An apparatus, process, and computer program product provide an improvement to downscaling techniques for image processing. Embodiments of the downscale processes may be applied to images rendered on printed documents. Aspects of the downscaling processes provide quality, discernible rendered images while being efficient with computing resources. Exemplary embodiments carryover binary bit data from adjacent regions into an application region being downscaled for determination of the downscale output. Depending on the downscale output value for the application region, bits from the application region may be carried over to adjacent regions and used in determining whether those regions, when processed will have an "ON" or "OFF value when downscaled.

18 Claims, 14 Drawing Sheets

Leading Region    320  Leading Top Edge
360   1    2    3 /  4    5 ⬇  6    7    8    9    10   11   12
    | 0 0| 0 1| 1 1| 0 0| 1 0| 0 1| 0 1| 1 1| 1 0| 0 0| 0 1| 1 1| A
    | 0 0| 0 0| 0 0| 1 1| 1 0| 0 0| 0 0| 1 1| 1 0| 0 0| 1 1| 1 1|
    | 0 1| 1 1| 1 1| 1 1| 1 1| 1 1| 1 1| 0 0| 0 1| 0 1| 1 1| 1 1| B
    | 0 0| 0 1| 0 1| 1 1| 0 1| 1 0| 0 0| 1 0| 0 0| 1 1| 1 1| 1 1|
    | 1 0| 0 1| 0 1| 1 1| 1 1| 1 1| 1 1| 0 0| 0 1| 1 1| 1 0| 0 0| C
    | 0 1| 1 1| 0 0| 0 0| 0 0| 1 1| 1 0| 0 1| 0 1| 1 1| 1 1| 0 0|
Leading       330        320
Left
Edge

FIG. 3A

325
 310  Carryover Region   Carryover to Right   Carryover Region
 0 0 0 1 1 1 0 0 1  1 0 1 1 1 0 0 0 1 1 1   A
 0 0 0 0 0 0 1 1 1  0 0 1 1 1 0 0 0 1 1 1
 0 1 1 1 1 1 1 1 1  1 1 1 1 0 0 0 1 0 1 1 1   B
 0 0 0 1 0 1 1 1 0  1 1 0 0 1 0 0 0 1 1 1 1     Carryover to Bottom
 1 0 0 1 0 1 1 1 1  1 1 1 1 0 0 0 1 1 1 0 0 0   C
 0 1 1 1 0 0 0 0 0  0 1 1 1 0 0 1 0 1 1 1 0 0
                   325   350   Application Region
 310

FIG. 3B

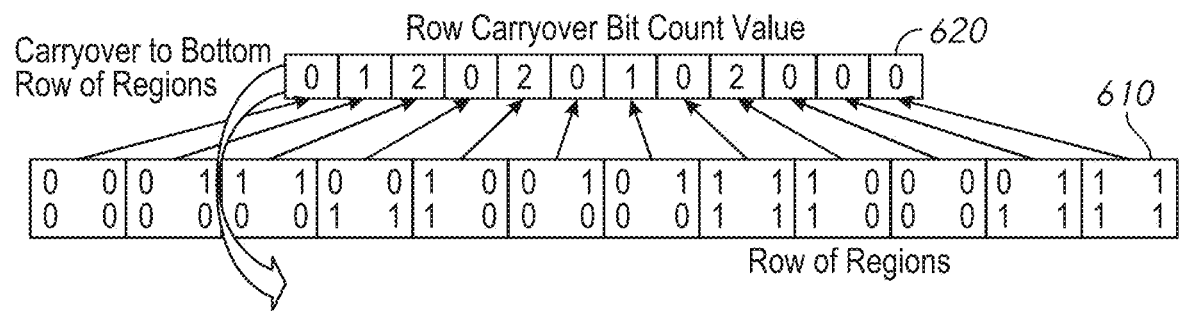
FIG. 5A    FIG. 5B    FIG. 5C
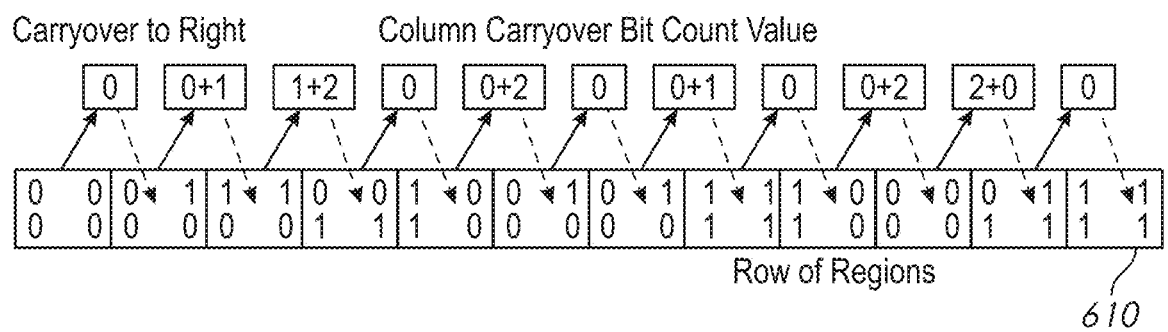
FIG. 6
FIG. 7

Condition 1 downscale process

The following shows the application of condition3 for the leading top edge.

The following shows the application of condition4 for the leading left edge.

Downscaled Binary Data:

The downscaled binary data contains 3 rows and each row contains 12 bits of data.

| 1 | 2 | 3 | 4 | 5 | 6 | 7 | 8 | 9 | 10 | 11 | 12 |
|---|---|---|---|---|---|---|---|---|----|----|----|
| 0 | 0 | 0 | 1 | 0 | 1 | 0 | 1 | 0 | 0  | 1  | 1  |
| 0 | 1 | 0 | 1 | 0 | 0 | 0 | 0 | 1 | 0  | 1  | 1  |
| 1 | 0 | 1 | 0 | 1 | 1 | 0 | 0 | 0 | 1  | 0  | 0  |

APPARATUSES, PROCESSES, AND COMPUTER PROGRAM PRODUCTS FOR IMAGE DATA DOWNSCALING

CROSS-REFERENCE TO RELATED APPLICATION

None.

FIELD

The subject disclosure relates to image processing and more particularly to apparatuses, processes, and computer program products for image data downscaling.

BACKGROUND

There are many downscaling methods that are currently being used in the industry. Some of them are geared towards performance while sacrificing on quality, and others tend to generate better quality but may not be time/resource efficient. These are general purpose methods used in the computer industry without focus on printed documents. For example, the result of one type of conventional downscaling approach may be seen in FIG. 1. An electronic user interface 100 is shown displaying a downscaled image 150. In the process of downscaling the image 150, an emphasis was placed on performance at the sacrifice of pixel data being lost thus leaving entire blank rows of pixels, which in this case, makes a large section of the image 150 indiscernible.

As can be seen, there is a need for an improved process for downscaling an image while keeping an image discernible without sacrificing too much performance.

SUMMARY

In one aspect of the disclosure, a method of downscaling image data for an array of pixels is disclosed. The method comprises receiving an input of pixel data representing an array of pixels, wherein the pixel data is in a binary format of bits divided into a plurality of regions based on a scale factor; computing a first carryover number of bits from a first carryover region positioned in a column to a left of a first application region; computing a second carryover number of bits from a second carryover region positioned in a row above the first application region; computing a first downscale value for the first application region based on bit values in the first application region, the first carryover number of bits in the first carryover region, and the second carryover number of bits in the second carryover region; and outputting downscaled pixel data using the first downscale value as a downscaled image.

In another aspect, a computer program product to downscale image data for an array of pixels is disclosed. The computer program product comprises a non-transitory computer readable storage medium having computer readable program code embodied therewith. The computer readable program code is configured, when executed by a processor, to: receive an input of pixel data representing an array of pixels, wherein the pixel data is in a binary format of bits divided into a plurality of regions based on a scale factor; compute a first carryover number of bits from a first carryover region positioned in a column to a left of a first application region; compute a second carryover number of bits from a second carryover region positioned in a row above the first application region; compute a first downscale value for the first application region based on bit values in the first application region, the first carryover number of bits in the first carryover region, and the second carryover number of bits in the second carryover region; and output downscaled pixel data using the first downscale value as a downscaled image.

In yet another aspect, an image rendering computing device is disclosed, which comprises: a memory module; and a processor in communication with the memory module. The processor is configured, via a set of executable instructions stored in the memory module, to: receive an input of pixel data representing an array of pixels, wherein the pixel data is in a binary format of bits divided into a plurality of regions based on a scale factor; compute a first carryover number of bits from a first carryover region positioned in a column to a left of a first application region; compute a second carryover number of bits from a second carryover region positioned in a row above the first application region; compute a first downscale value for the first application region based on bit values in the first application region, the first carryover number of bits in the first carryover region, and the second carryover number of bits in the second carryover region; and output downscaled pixel data using the first downscale value as a downscaled image.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

FIG. 3 is a diagrammatic view of an array of input binary pixel data.

FIG. 3A is a diagrammatic view of the array of FIG. 3 divided up into regions based on a scale factor of 2.

FIG. 3B is a diagrammatic view of the array of FIG. 3 illustrating a process of carrying over bit data from adjacent regions during a downscale process in accordance with an embodiment of the subject technology.

FIGS. 5A, 5B, and 5C are diagrammatic views of binary bit regions used as examples to define values in accordance with embodiments of the subject technology.

FIG. 6 is a diagrammatic view of a row of regions from the array of FIG. 3 illustrating computed values for a row carryover bit count value in accordance with embodiments of the subject technology.

FIG. 7 is a diagrammatic view of a row of regions from the array of FIG. 3 illustrating computed values for a column carryover bit count value in accordance with embodiments of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Like or similar components are labeled with identical element numbers for ease of understanding.

As will be appreciated, embodiments disclosed below may be practiced in and have industrial applicability to the general fields of image processing.

Definitions/Acronyms

Application region: a region of bits being processed for downscaling.

Column carryover bit count: an accumulation of a first carryover value and number of "1" bits in an application region.

Row carryover bit count value: an accumulation of a second carryover value and number of "1" bits in an application region.

Number of column values: the sum of outputs from all rows of an application region; wherein the output of a row in the application region depends on the threshold value of a row, wherein the threshold value of a row comprises half the number of bits in a row being "1".

Generally, embodiments of the disclosure describe a carryover binary downscale process. The carryover binary downscale process achieves a balance between performance and quality for processing images (used for example in printed documents). Aspects of the process are time efficient and produce quality images. This may be especially important for processes involving printed documents. In a work environment with high volume printing, data intensive print jobs may place a heavy burden on the network and print apparatus. Downscaling helps ease the burden from intensive print traffic, however, images need to retain enough quality so that the user can discern the image content.

Embodiments of the process divide the input pixel data of an image into an array that is being downscaled. The array may be divided up into regions of bits. An application region may have downscaled output of 1 if the application region meets certain conditions, or the if the data carried over from adjacent bit regions satisfies certain conditions. In general, regions that are not solid pixels may have their pixel data carried over to an adjacent non-solid pixel region. Accordingly, data that would be previously lost under conventional approaches may be used as part of downscaling so that some regions that would otherwise appear blank are at least partially filled in.

Figure 1:
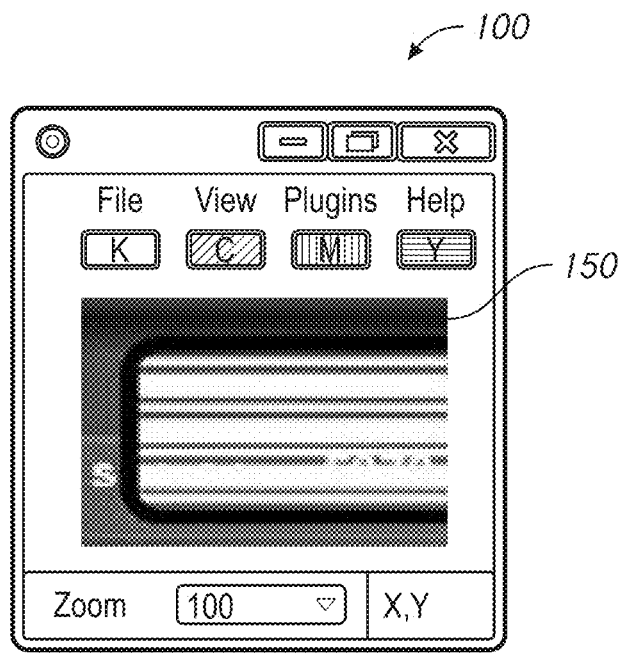
FIG. 1 is a screenshot of a user interface displaying a downscaled image using prior art techniques.
Figure 2:
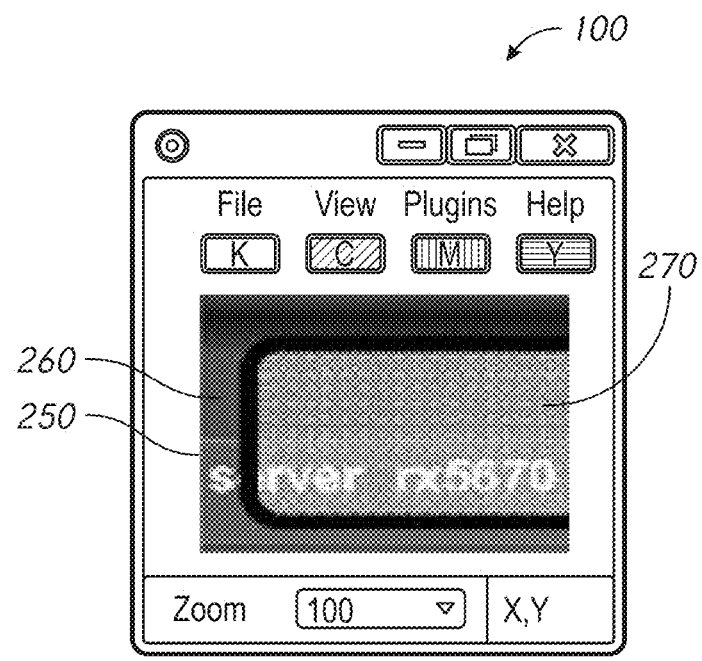
FIG. 2 is a screenshot of a user interface displaying a downscaled image in accordance with an embodiment of the subject technology.
Figure 4:
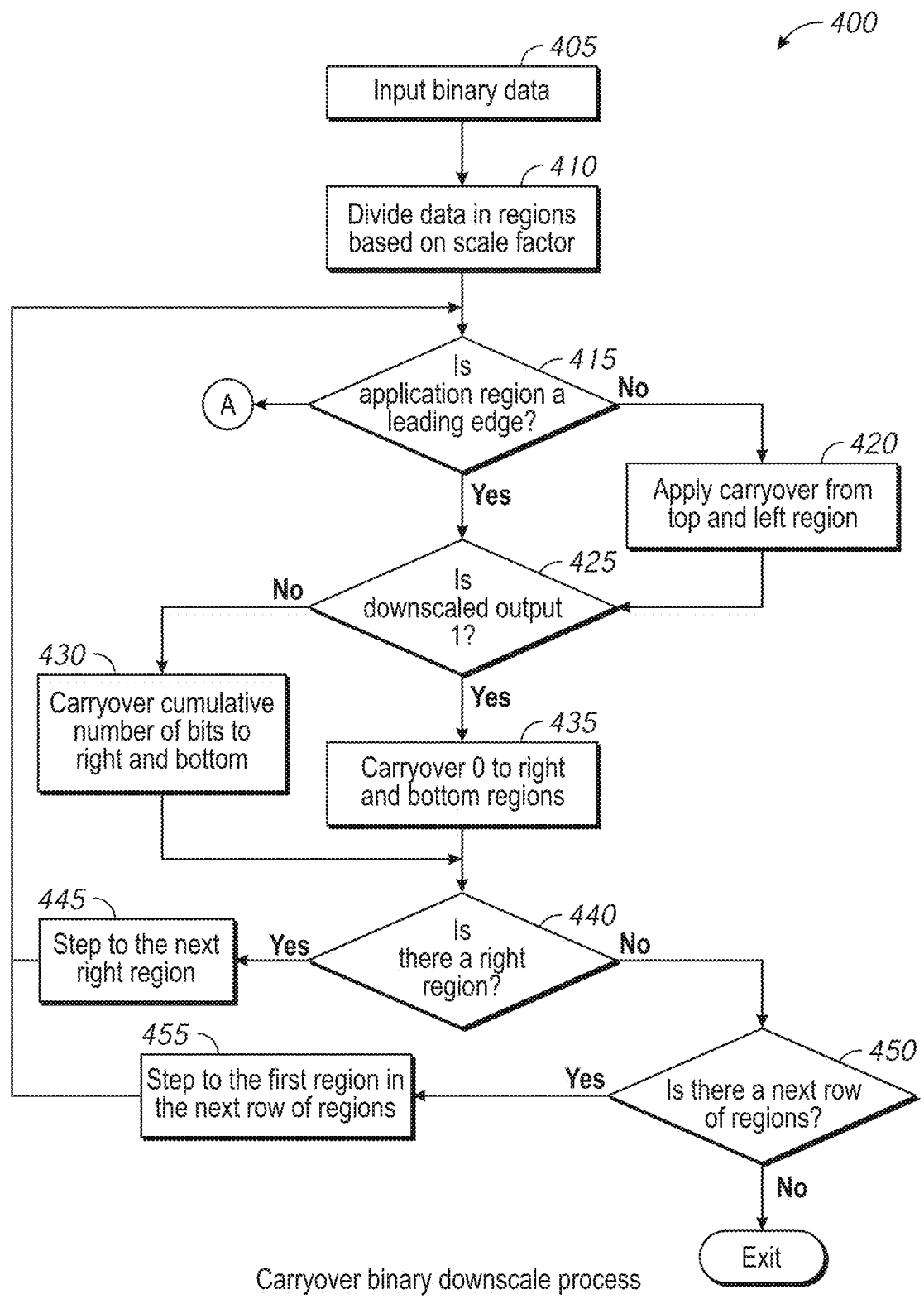
FIG. 4 is a flowchart of a process of downscaling image data using a binary carryover of bit data in accordance with embodiments of the subject technology.

Referring to FIG. 2, a display screen shows a rectangular area 250 that is filled with an area 260 of black color. The rectangular area 250 contains an image 270 and text in white color. It will be understood that prior to downscaling, the image 270 would have pixel density (color shading) of equal weight (except for the text portion which is shown in white for sake of illustration). In comparison to image 150 of FIG. 1, the downscaled image 270 retains a homogenous background so that the text is perceptible against the background. The pixel data in image 270 is more evenly distributed in comparison to image 150 of FIG. 1, without sacrificing performance in the process. The background processes to achieve this result are described in the following paragraphs.

Referring now to FIGS. 3, 3A, 3B, and 4, overview diagrams of a pixel array 300 are shown and should be referenced concurrently with a carryover binary downscale process 400 shown (and sometimes referred to generally as the "process 400") according to exemplary embodiments. Reference to elements in parenthesis are describing steps of the process 400.

The pixel array 300 may represent the downscaled image 270 (FIG. 2). The array 300 may comprise input data bits 310. In an exemplary embodiment, the bits 310 may be in binary format using "0" and "1" values. On receipt of input binary data (405) for the image section being downscaled, the array 300 may be divided (410) into regions (designated generally as "regions 320") (shown demarcated in FIGS. 3A and 3B). The array of pixel data 300 shown in FIG. 3 contains 6 rows and each row contains 24 bits of data. A region 320 contains a specified number of bits in rows and columns based on a scale factor applied to the array 300. For example, the array 300 shown is divided up using a scale factor of 2 so that two columns and two rows will be converted into one bit. Accordingly, each region 320 may include four bits (2 bits in one row×2 bits in one column), which may be used to determine carryover values. However, it will be understood that with a different scale factor, the regions 320 may include a different number of bits. As will be discussed in detail below, adjacent regions 320 are used to determine a downscale value for an application region 350. "Adjacent" regions may in one embodiment, refer to regions that abut one another. For example, at least one pixel from one region may be immediately next to a pixel from an abutting region.

In an exemplary embodiment, the process 400 may be performed by stepping from left to right between regions and from a top region to a bottom region until all regions are exhausted. In some embodiments, the process may determine (415) whether an application region 350 being processed is part of a leading edge of an image. In FIG. 3A, the array 300 is shown as a leading edge. The array 300 is divided up into columns labeled 1-12 and rows labeled A-C (for a 3×12 array of regions 320) when a scale factor of "2" is applied. The left column 330 of regions 320 (labeled as column "1") may be considered a left leading edge. The top row 360 (labeled as row "A") may be considered a top leading edge.

In an exemplary embodiment, the process may use three regions 320 at a time for performance to determine the result. For example, the process may use two carryover regions 325 and an application region 350. The application region 350 may be the region being processed for downscaling. The carryover regions 325 carry (420) the number of bits 310 to be applied to the application region 350. For example, a number of bits from the region 320 to the left of the application region being processed and from the region 320 above the application region may be carried into the application region 350. The application region 350 may use its own bits 310 and the carryover regions' 325 bits to produce the downscaled output.

The "1" bits in a region 320 may represent an "ON" value and the "0" bits may represent an "OFF" value. The number of "1" bits in an application region 350 along with the number of "1" bits in the carryover regions 325 may determine the outcome for an application region 350. In an exemplary embodiment, a carryover region 325 carries the number of bits 310 to the next region 320 only if the downscaled outcome from its own region is not an "ON" value (determination 425). The determination of whether the downscale output is "1" may also be performed for leading edge regions without the carryover step (420).

For applications regions with a downscaled output of "1" ("ON"), a "0" may be carried over to the next region 320 to the right and to the bottom of the application region 350 being processed (in other words, no bits may be carried over to the next region being processed).

For downscaled outputs of an application that do not result in a "1" ("ON") value, a cumulative number of bits 310 may be carried (430) over to the next region 320 to the right and to the bottom of the application region 350 that was processed.

In some embodiments, the process may determine (440) whether there remains a region 320 in the array 300 to the right of the application region 350 that was just processed for downscaling. If a region is available to the right, the process may step (445) to the next region for downscale processing and may iterate the process from the step of determining whether the next application region 350 is on a leading edge (or from the step of computing carryover bit values (420)). Otherwise, if there are no regions remaining in the row, the process may determine (450) whether any next rows of regions are available to process. If a row is available, the process may step (455) to the first region in the next row and process the region from the step of determining (415) whether the region is on a leading edge. The above description assumes the process flows left to right across rows and then drops down to the next row as described above. However, for alternate embodiments that use a different direction, it will be understood that the process steps to the next logical region 320 being processed according to the direction used. In addition, alternate embodiments may begin from other rows and columns that may be a leading edge for the direction the process flows (for example, the right-most column, the bottom-most row or some column and/or row in between if the process begins for only a section of a pixel array).

The following describes the step of carrying over bit values in additional detail according to exemplary embodiments.

The carryover binary downscale process may step through all regions 320 in an array 300, downscaling one region 350 at a time. In an exemplary embodiment, the process may use the following values to determine the downscaled output from an application region 350 as well as the carryover values. The terms are followed by a string value for coding which may be seen later in the disclosure.

Number of Bits in Application Region (num_application_region_bits): The number of bits in application region (num_application_region_bits), is the number of "1" values in the application region. FIG. 5A, shows an application region 510 containing two rows and two columns. The number of "1" bit values in this example region are 3.

Solid Pixel Value (solid_pixel_value): A solid pixel value (solid_pixel_value), is the value when all bits in a region are "1". FIG. 5B shows a region 520, where all 4 bits in the region are "1". The solid pixel value shown is thus, 4.

Pixel Threshold Value (pixel_threshold_value): A pixel threshold value (pixel_threshold_value), may be a user defined value. FIG. 5C shows an illustration of a pixel threshold value, where half the bits in a region are "1". The pixel threshold value in the region 530 is 2.

Row carryover bit count value (row_bit_count_carryover): Referring now to FIG. 6, a row of regions 610 is shown being processed for row carryover bit count values 620 for each region. A row of regions 610 may include a plurality of regions in sequence from left to right. The row of regions 610 may comprise a plurality of rows of pixels in a single region. The row 610 is a duplicate of the first row (leading top edge) of the row shown in array 300 of FIG. 3, (which is also row 360 of FIG. 3A). A row carryover bit count value (row_bit count carryover), carries over the number of bits from a row 610 of regions to be applied to the next row of regions below the row 610. A "row carryover bit count value" may contain a non-zero value only if the downscaled outcome from a region is not an "ON" value. The row carryover bit count value may be a cumulative value that carries over from the previous row carryover bit count value to the next row carryover bit count value, until the downscaled output from an application region is an "ON" value. The process uses the number of bits in the application region along with the row carryover bit count value and the column carryover bit count value to determine the downscaled output. As shown in FIG. 6, an arrow connects the row carryover bit count values 620 from their respective regions.

Column Carryover Bit Count Value (column_bit_count_carryover): Referring now to FIG. 7, the row 610 is shown being processed for a Column carryover bit count value for each region in the row. A Column carryover bit count value (column_bit_count_carryover), carries over the number of bits from a region to be applied to the next region to the right. The column carryover bit count value may be a cumulative value that carries over from the previous column carryover bit count value to the next column carryover bit count value, until the downscaled output for an application region is an "ON" value. A column carryover bit count value may contain a non-zero value if the downscaled outcome from a region is not an "ON" value. For example, the sixth region from the left shows a "0" column carryover bit count value even though the column carryover bit count value from the region to the left is "2" and its own bit value is "1". Thus, one would expect the resulting column carryover bit count value to be "3". However, the column carryover bit count value is "0" because the downscale value is "ON" once all the conditions applied to the application region are processed. The details of all the conditions will be described further below.

Figure 8:
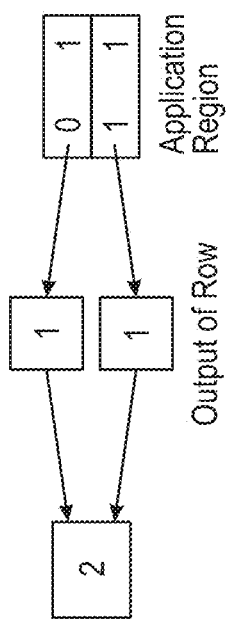
FIG. 8 is a diagrammatic view of two regions used as examples illustrating computed values for a number of column values in accordance with embodiments of the subject technology.
Figure 8:
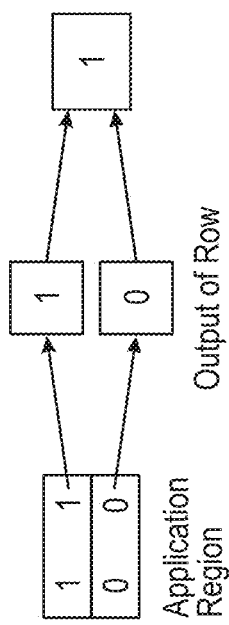

Number of Column Values in a Region (num_col_values): Referring now to FIG. 8, a diagram showing two different regions being processed for a number of column values is shown according to an embodiment. As described previously, an application region contains bits that are arranged in rows and columns. The process goes through each row of the application region and determines the output of each row by comparing it against a threshold value for that row. The output of each row in the application region is either a "1" or a "0" value for the column value. The number of column values (num_col_values) may be the sum of outputs from all rows in an application region. The following shows two illustrations of calculating the number of column values. The region on the left has "1" bits only on the top row. The bottom row has no "1" bits so its output is "0". The number of column values for this region is thus, "1". The region on the right has "1" bits in each row so the output of each row is "1", which when summed provides a number of column values equal to "2". As will be seen, the number of column values will be used in computing the outcome for "Condition 2" of the downscale computations described below.

Downscale Conditions:

The carryover binary downscale process uses the following conditions to determine the downscaled output value from an application region. The output from an application region is either an ON ("1") value or an OFF ("0") value depending on the following conditions.

Condition 1

Figure 9:
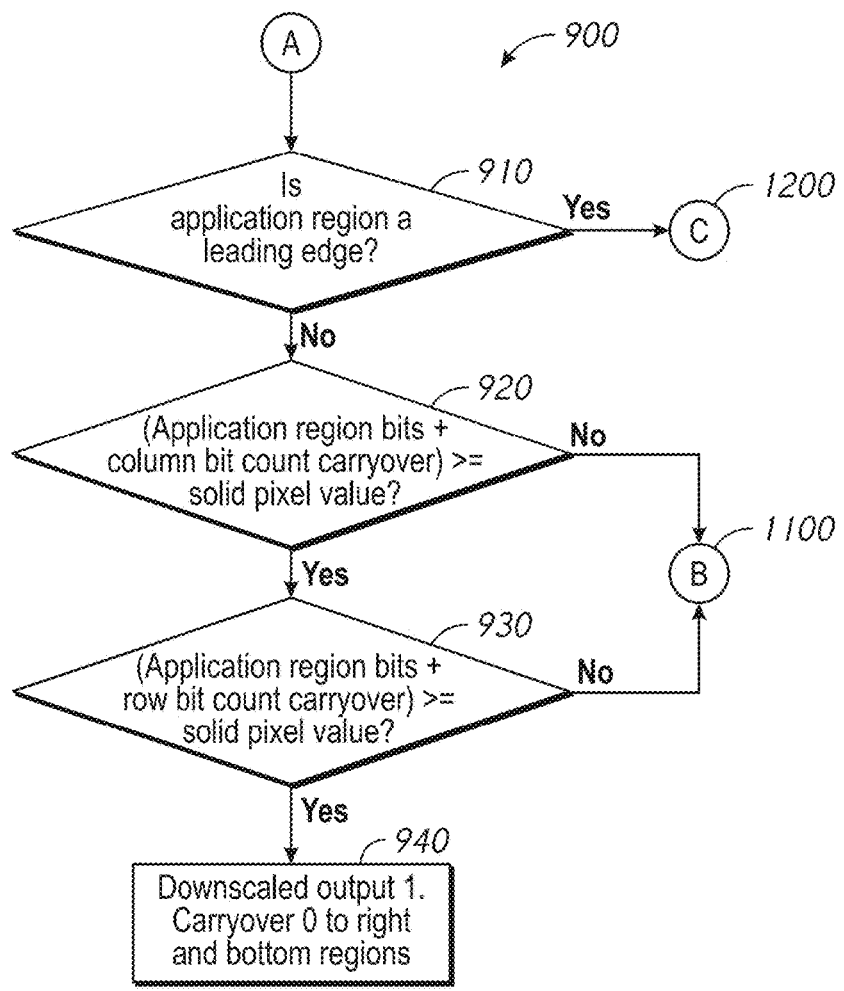
FIG. 9 is a flowchart of a process for a first condition of a downscale process in accordance with embodiments of the subject technology.

Referring now to FIG. 9, a process 900 for computing a first condition (referred to as "Condition 1") for a downscale process is shown according to an exemplary embodiment. Condition 1 uses the "number of bits in application region", the "row carryover bit count value" and the "column carryover bit count value" to determine the output from an application region. In an initial step, the process may determine (910) whether the application region under process is on a leading edge. If so, the process may go to the process 1400 shown in FIG. 13. The downscaled output from this condition results in an "ON" ("1") value if all of the following conditions are true.

The process may determine (920) whether the "number of bits in application region" plus the "column carryover bit count value" from the region to the left of the application region is greater than or equal to the "solid pixel value". If so, and the process determines (930) that the "number of bits in application region" plus the "row carryover bit count value" from the top region (above the application region) is greater than or equal to the "solid pixel value", then the downscale output value may be "ON". A "0" value may be carried (940) to the next regions to the right and below the application region that was processed.

Figure 11:
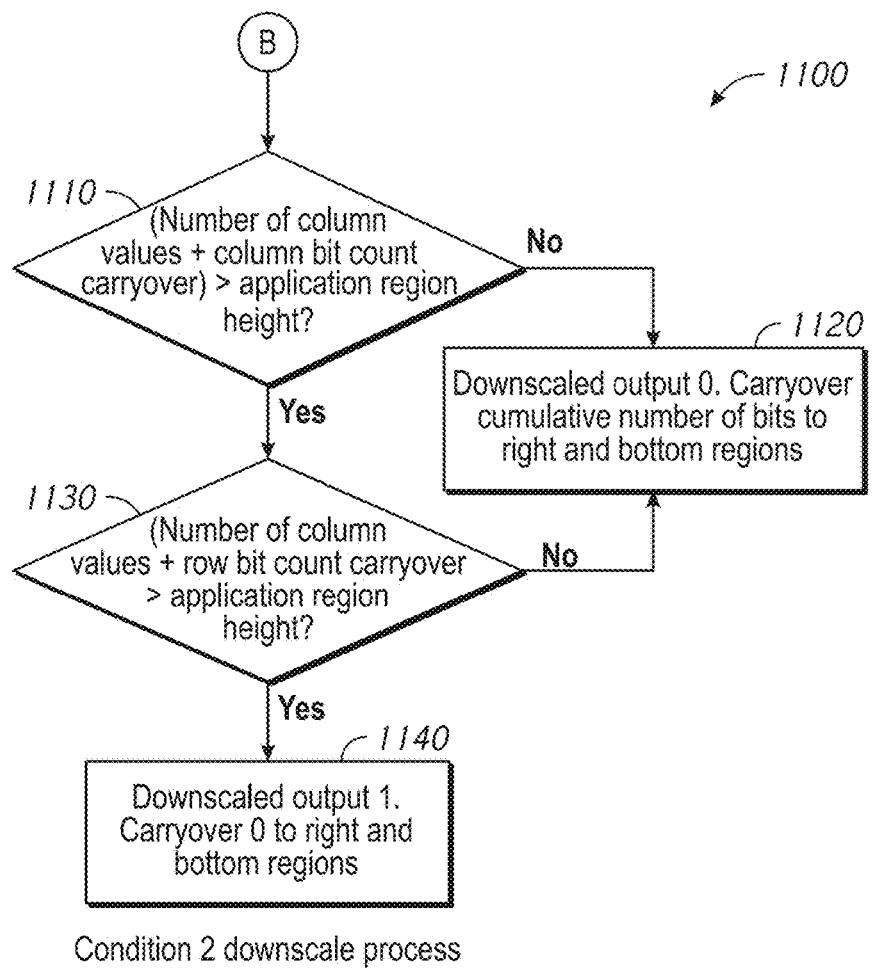
FIG. 11 is a flowchart of a process for a second condition of a downscale process in accordance with embodiments of the subject technology.

However, if either of the determination steps 920 or 930 are not satisfied, then the process may go to the process 1100 for Condition 2 shown in FIG. 11. A sample section of pseudo-code for Condition 1 is shown in Table 1.

In the tables that follow, the code shown is just an example and it will be understood that variables may be labeled differently in actual executable code. Also, there may be some variation in the labels used in the code shown in comparison to variables disclosed in the specification.

TABLE 1

```
if (((num_application_region_bits + column_bit_count_carryover) >= solid_pixel_value) &&
    ((num_application_region_bits + row_bit_count_carryover) >= solid_pixel_value)))
{
    /* downscaled output pixel ON (1), no carryover */
    column_bit_count_carryover  = 0;
    row_bit_count_carryover     = 0;
If the output from an application region is an ON (1) value, the carryover for both "row carryover bit count
value" and "column carryover bit count value" is 0.
}
else
{
    /* Check Condition2 */
}
```

Figure 10:
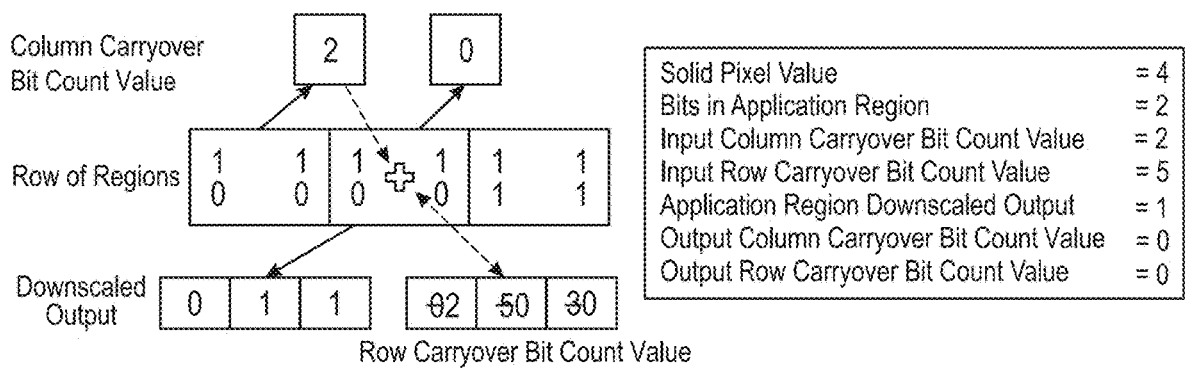
FIG. 10 is a diagrammatic view of a section of a row of regions illustrating an effect of the first condition of the downscale process on an application region in accordance with embodiments of the subject technology.

FIG. 10 shows the effect of Condition 1 on an application region, in a section of a row of adjacent regions. The application region is the region in the center. The regions shown correspond to the regions in FIG. 3A in row C at columns 4, 5, and 6. The values with strikethrough represent the row carryover bit count value from the previous row (which can be seen in FIG. 19). The row carryover bit count value contains a non-zero value only if the downscaled outcome from an application region is an "OFF" value. The values that are beside the strikethrough represent the row carryover bit count value to the next row.

Condition 2

Referring now to FIG. 11, a process 1100 for computing a second condition (referred to as "Condition 2") for a downscale process is shown according to an exemplary embodiment. Condition 2 uses the "number of column values", the "number of bits in application region", the "row carryover bit count value" and the "column carryover bit count value" to determine the output from an application region. The downscaled output from this condition results in an "ON" ("1") value if all of the following conditions is true.

The process may determine (1110) whether the "number of column values" in a region plus the "column carryover bit count value" from the region to the left of the application region is greater than the height of the application region. If so, and if the process determines (1130) that the "number of column values" in the application region plus the "row carryover bit count value" from the region above the application region is greater than the height of the region, then the downscaled output value for the application region may be set (1140) to "ON" (or "1").

However, if either of the determination steps 1110 or 1130 are not satisfied, then the process may generate (1120) a downscale output of "0" for the application region which in effect turns the pixel off. The process may take the cumulative number of bits from application regions with a downscale value of "0" and carry them over to the next region to the right of the application region and to the region below the application region.

A sample section of pseudo-code for Condition 2 is shown in Table 2.

Figure 12:
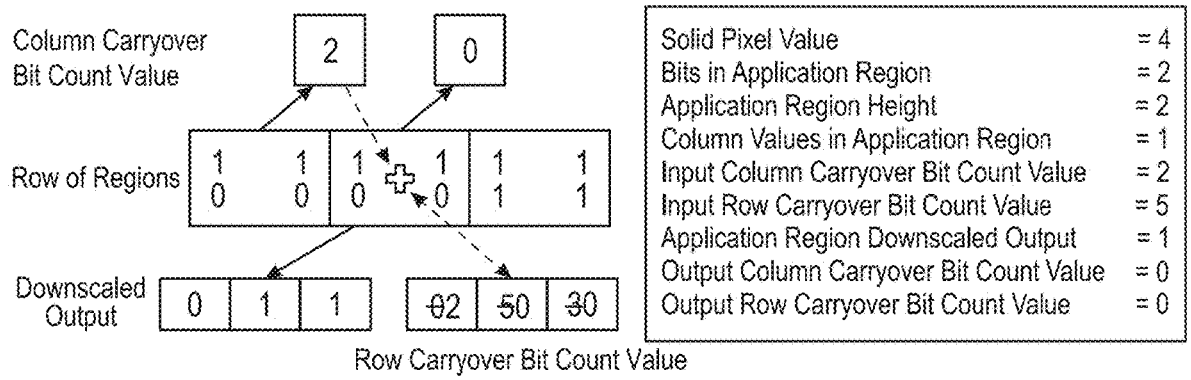
FIG. 12 is a diagrammatic view of a section of a row of regions illustrating an effect of the second condition of the downscale process on an application region in accordance with embodiments of the subject technology.

FIG. 12 shows the effect of Condition 2 on an application region, in a section of a row of adjacent regions. The application region is the region in the center. The regions shown correspond to the regions in FIG. 3A in row C at columns 4, 5, and 6.

Figure 21:
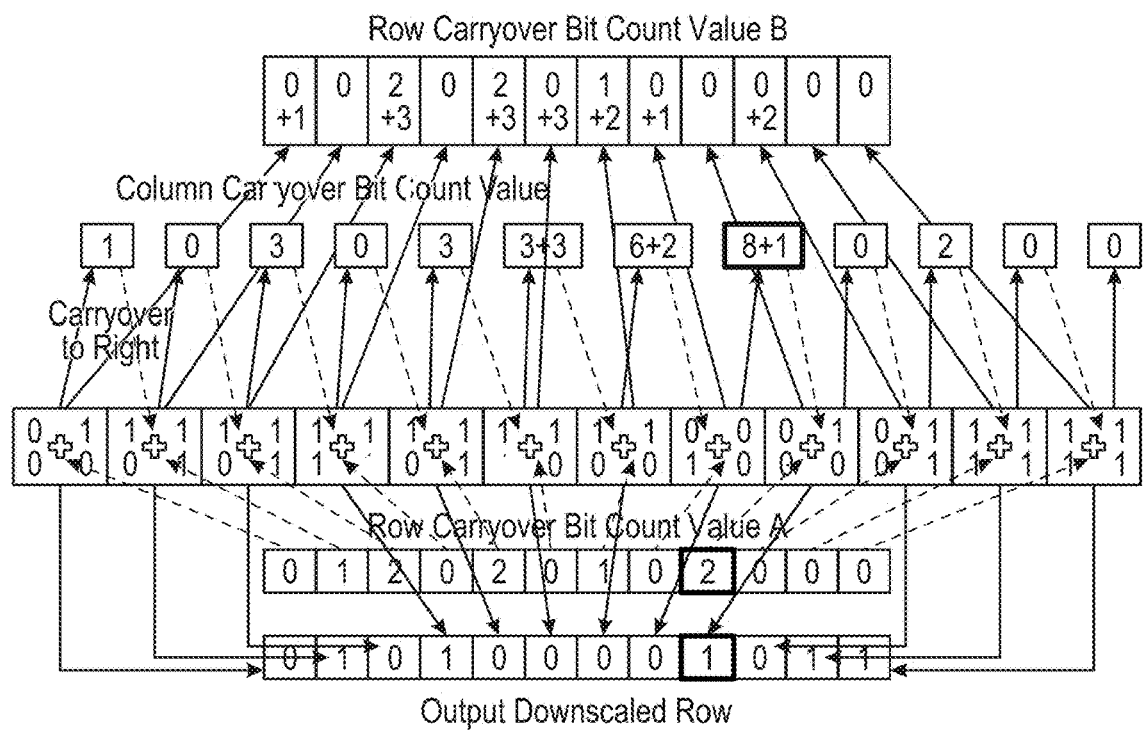
FIG. 21 is a diagrammatic view of the middle row of FIG. 17, illustrating computation of the downscale output for the row as affected by the values computed in FIG. 20, in accordance with embodiments of the subject technology.
Figures 22, 23:
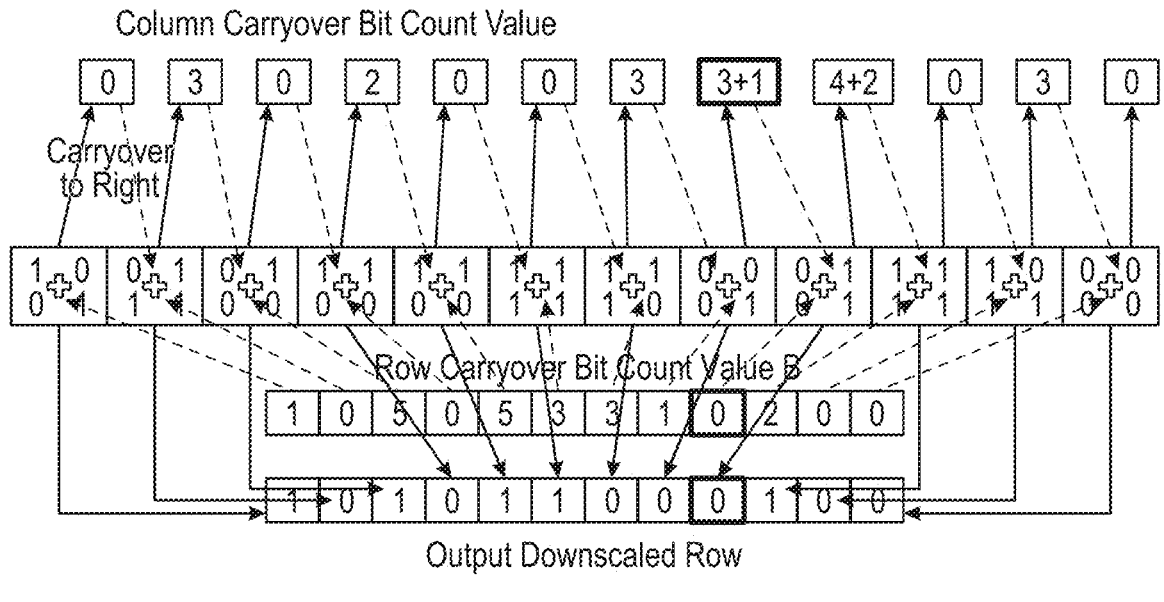
FIG. 22 is a diagrammatic view of the bottom row of FIG. 17, illustrating computation of the downscale output for the row as affected by the values computed in FIG. 21, in accordance with embodiments of the subject technology.
FIG. 23 is a diagrammatic view of a downscaled pixel array output by the results of the values computed in FIGS. 20, 21, and 22 in accordance with embodiments of the subject technology.

Examples of how Condition 1 and Condition 2 are applied to non-leading edge rows B and C (FIG. 3A) are shown in FIGS. 21 and 22.

Condition 3

Figure 13:
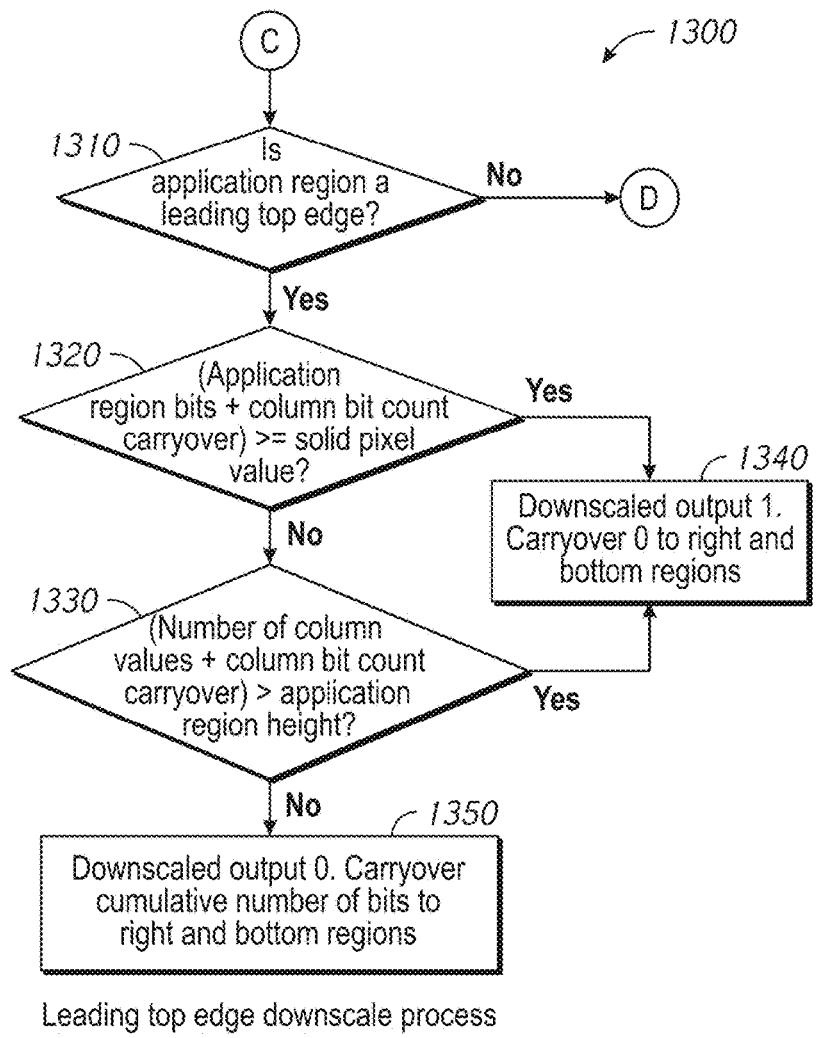
FIG. 13 is a flowchart of a process for downscaling a region in a leading top edge of a pixel array in accordance with embodiments of the subject technology.

Referring now to FIG. 13, a process 1300 of downscaling regions in a leading top edge is shown according to an exemplary embodiment. The process may determine (1310) whether the region is in a leading edge of a top row of a pixel array. For regions on the top edge, downscaling the application region uses the "number of bits in the application region" and the "column carryover bit count value" to determine the output from the application region. The "row carryover bit count value" may be only generated, (used for example in rows below the top edge) but may not be used for the leading top edge. The downscaled output from this condition results in an "ON" ("1") value if any of the following conditions is true.

The process may determine (1320) whether the "number of bits in the application region" plus the "column carryover bit count value" from the region to the left of the application region is greater than or equal to the "solid pixel value". If so, the output value may be set (1340) to "ON". If not, the process may continue.

The process may determine (1330) whether the "number of column values" in the application region plus the "column carryover bit count value" from the region to the left of the application region is greater than the height of the region. If so, the output value may be set (1340) to "ON".

However, if neither of the determination steps 1320 and 1330 are satisfied, then the process may generate a downscaled output value of "0" and carry (1350) the cumulative number of bits from the application region over to the next region to the right of the application region and to the region below the application region.

A sample section of pseudo-code for Condition 3 is shown in Table 3.

TABLE 2

```
if (((num_col_values + column_bit_count_carryover) > application_region_height) &&
    ((num_col_values + row_bit_count_carryover) > application_region_height))
{
  /* downscaled output pixel ON (1), no carryover */
  column_bit_count_carryover    = 0;
  row_bit_count_carryover       = 0;
If the output from an application region is an ON (1) value, the carryover for both "row carryover bit count
value" and "column carryover bit count value" is 0.
}
else
{
  /* downscaled output pixel OFF (0), carryover to the right and bottom */
  column_bit_count_carryover    += num_application_region_bits;
  row_bit_count_carryover       += num_application_region_bits;
If the output from an application region is an OFF (0) value, the carryover for both "row carryover bit
count value" and "column carryover bit count value" is incremented by "number of bits in application
region".
}
```

TABLE 3

```
if (((num_application_region_bits + column_bit_count_carryover) >= solid_pixel_value) | |
    ((num_col_values + column_bit_count_carryover) > application_region_height))
{
    /* downscaled output pixel ON (1), no carryover */
    column_bit_count_carryover    = 0;
    row_bit_count_carryover       = 0;
If the output from an application region is an ON (1) value, the carryover for both "row carryover bit count
value" and "column carryover bit count value" is 0.
}
else
{
    /* downscaled output pixel OFF (0), carryover to the right and bottom */
    column_bit_count_carryover    += num_application_region_bits;
    row_bit_count_carryover       += num_application_region_bits;
If the output from an application region is an OFF (0) value, the carryover for both "row carryover bit
count value" and "column carryover bit count value" is incremented by "number of bits in application
region".
```

Figure 14:
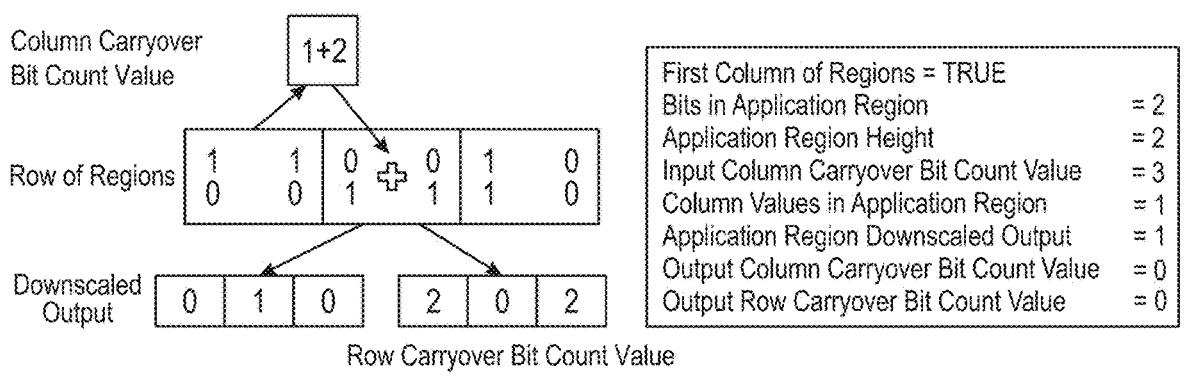
FIG. 14 is a diagrammatic view of a section of a leading top edge row of regions illustrating an effect of the downscale process of FIG. 13 on an application region in accordance with embodiments of the subject technology.

FIG. 14 shows the effect of Condition 3 on an application region, in a section of a top edge row of adjacent regions. The application region is the region in the center. The regions shown correspond to the regions in FIG. 3A in row A at columns 3, 4, and 5.

Condition 4

Figure 15:
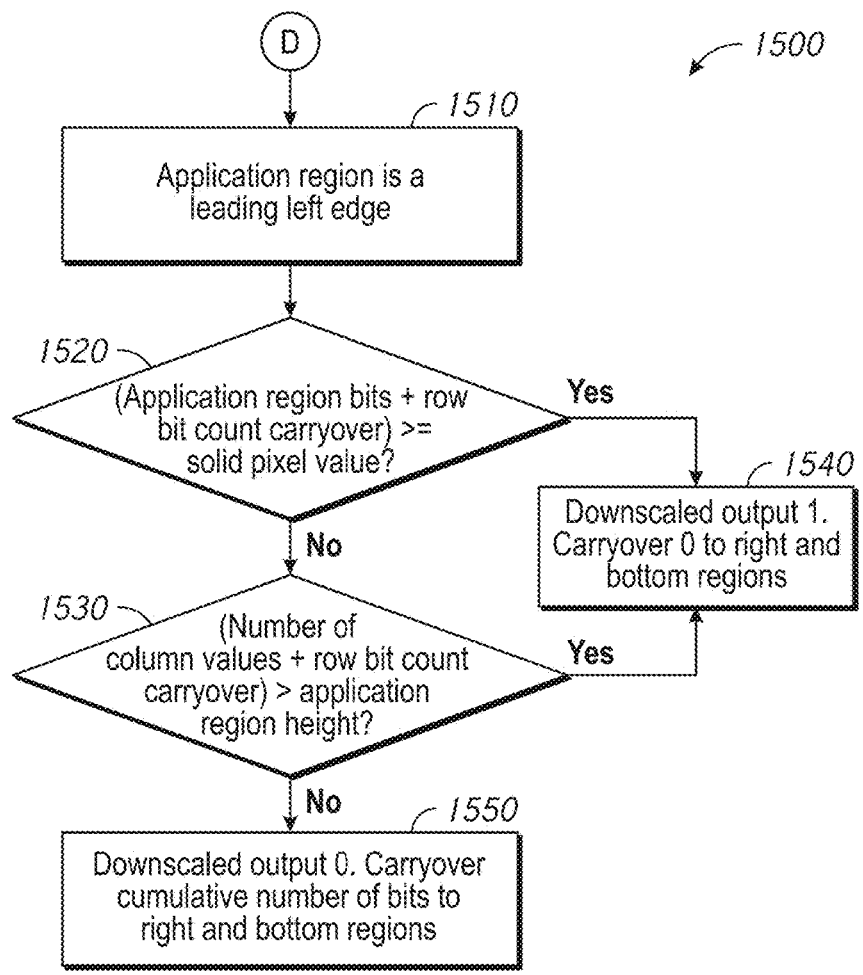
FIG. 15 is a flowchart of a process for downscaling a region in a leading left edge of a pixel array in accordance with embodiments of the subject technology.

Referring now to FIG. 15, a process 1500 of downscaling regions in a leading left edge is shown according to an exemplary embodiment. The process may determine (1510) whether the region is in a leading edge of a left side column of a pixel array. For regions in the left edge, downscaling the application region uses the "number of bits in application region" and the "row carryover bit count value" to determine the output from an application region. The "column carryover bit count value" may only be generated (for use, for example with columns to the right of the leading left edge) but may not be used for the leading left edge. The downscaled output from this condition results in an "ON" ("1") value if any of the following conditions is true.

The process may determine (1520) whether the "number of bits in the application region" plus the "row carryover bit count value" from the region above the application region is greater than or equal to the "solid pixel value". If so, the output value may be set (1540) to "ON". If not, the process may continue.

The process may determine (1530) whether the "number of column values" in the application region plus the "row carryover bit count value" from the region above the application region is greater than the height of the region. If so, the output value may be set (1540) to "ON".

However, if neither of the determination steps 1520 and 1530 are satisfied, then the process may generate a downscaled output value of "0" and carry (1550) the cumulative number of bits from the application region over to the next region to the right of the application region and to the region below the application region.

A sample section of pseudo-code for Condition 4 is shown in Table 4.

TABLE 4

```
if (((num_application_region_bits + row_bit_count_carryover) >= solid_pixel_value) | |
    ((num_col_values + row_bit_count_carryover) > application_region_height))
{
    /* downscaled output pixel ON (1), no carryover */
    column_bit_count_carryover    = 0;
    row_bit_count_carryover       = 0;
If the output from an application region is an ON (1) value, the carryover for both "row carryover bit count
value" and "column carryover bit count value" is 0.
}
else
{
    /* downscaled output pixel OFF (0), carryover to the right and bottom */
    column_bit_count_carryover    += num_application_region_bits;
    row_bit_count_carryover       += num_application_region_bits;
If the output from an application region is an OFF (0) value, the carryover for both "row carryover bit
count value" and "column carryover bit count value" is incremented by "number of bits in application
region".
```

Figure 16:
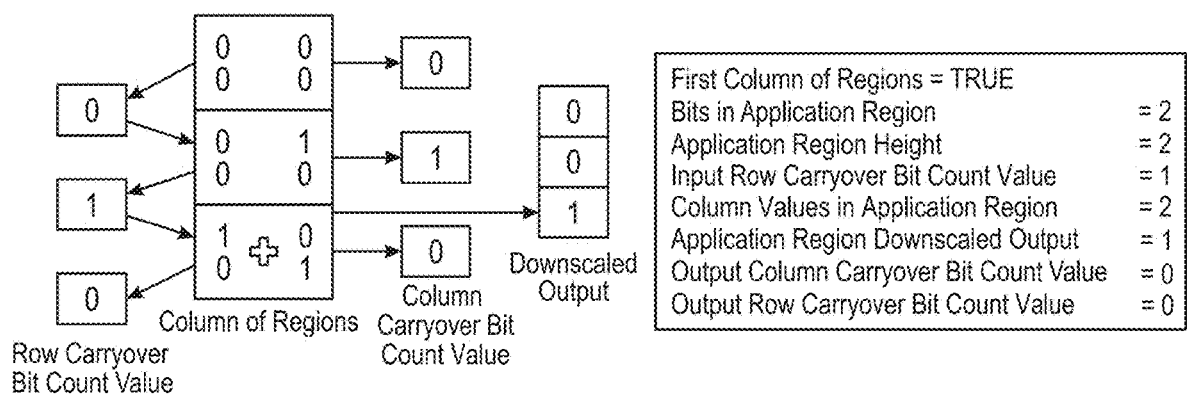
FIG. 16 is a diagrammatic view of a section of a column of regions including a leading left edge region illustrating an effect of the downscale process of FIG. 15 on the application region in the left edge in accordance with embodiments of the subject technology.

FIG. 16 shows the effect of Condition 4 on an application region, in a left edge column adjacent other regions in a same row. The application region is the region on the left end of the row. The regions shown correspond to the regions in FIG. 3A in Column 1 at rows A, B, and C.

The following describes in detail some of the values used in the conditions referenced above.

Figure 17:
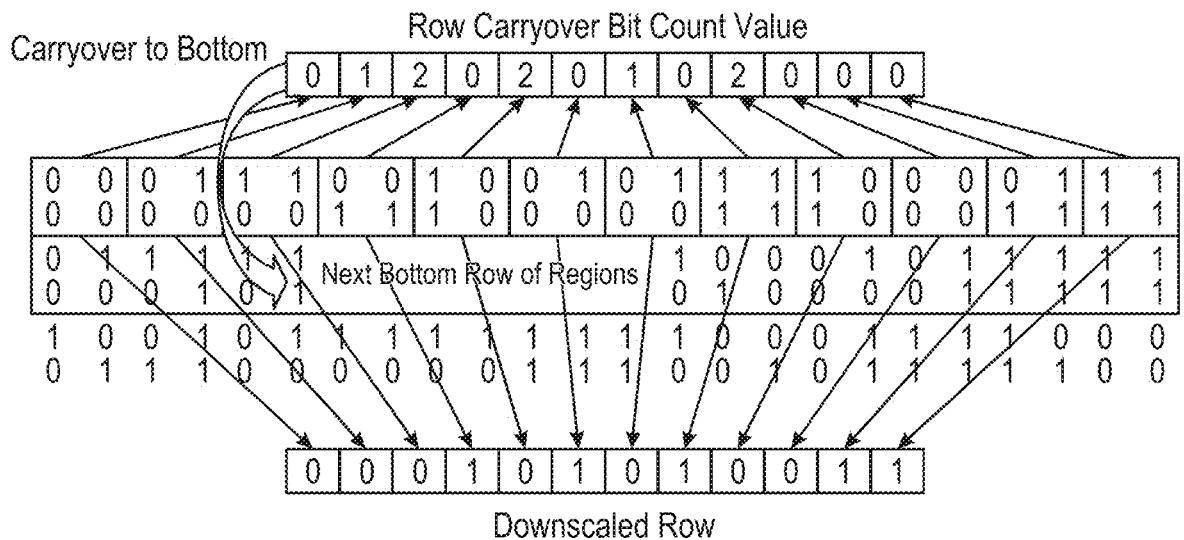
FIG. 17 is a diagrammatic view of adjacent rows of binary bit data regions illustrating computation of row carryover bit counts in accordance with embodiments of the subject technology.

Referring now to FIG. 17, a diagram illustrating generation of the row carryover bit count values carried over to adjacent regions is shown. The carryover binary downscale process converts a row containing regions, to a downscaled binary data row. It implements a "row carryover bit count value" to be applied to the next bottom row (the row below application regions being processed for downscaling). This value keeps track of the number of bits in the regions of a row that need to be carried over to the next row. The "row carryover bit count value" contains a non-zero value only if the downscaled outcome from an application region is an "OFF" value.

Since a "row carryover bit count value" is computed when the process downscales a region stepping from top to bottom, this "row carryover bit count value" does not exist for the first row of regions (top edge of a binary image). The first row of regions behaves as if there is no "row carryover bit count value" (as discussed above with respect to Condition 3), and the downscaled output is based on the "column carryover bit count value" and the application region. Once the "row carryover bit count value" is computed, it can be applied to the next row of regions.

Since there is no carryover data for the first (top left) region, the carryover binary downscale process may use a value of zero carried over to downscale the binary data for the first region.

Figure 20:
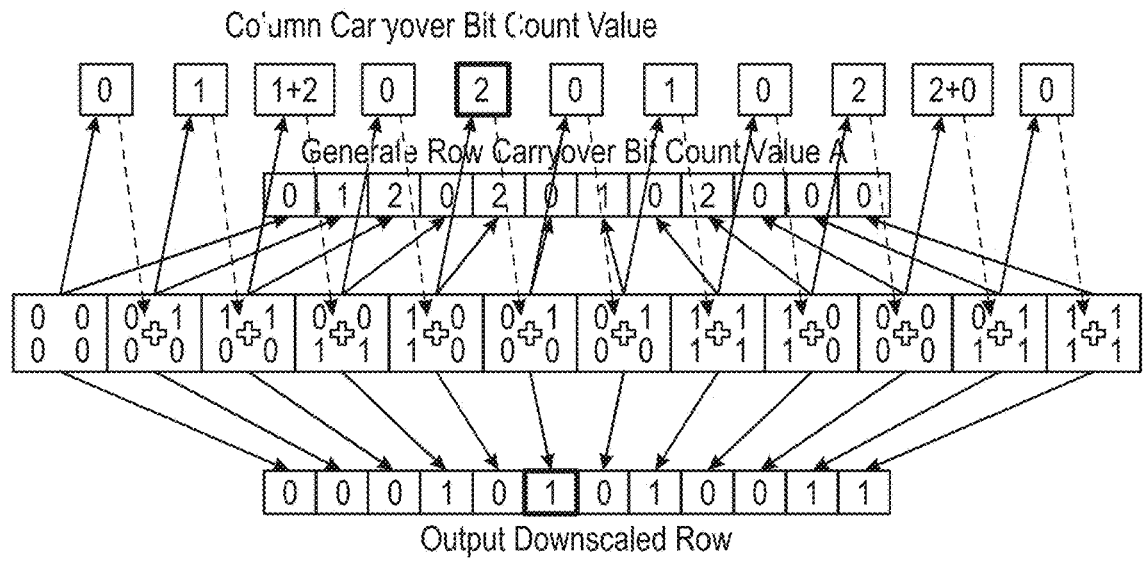
FIG. 20 is a diagrammatic view of the top row of FIG. 17, a top leading edge, illustrating computation of the downscale output for the row in accordance with embodiments of the subject technology.

The process, in the first row of regions, computes and generates both "column carryover bit count value" and "row carryover bit count value" during the binary downscale process. Only the "column carryover bit count value" is used in the downscale process for the first row of regions. The "row carryover bit count value" that is generated from the first row of regions will be applied to the next row of regions. An illustration of the process may be seen in FIG. 20.

Figure 18:
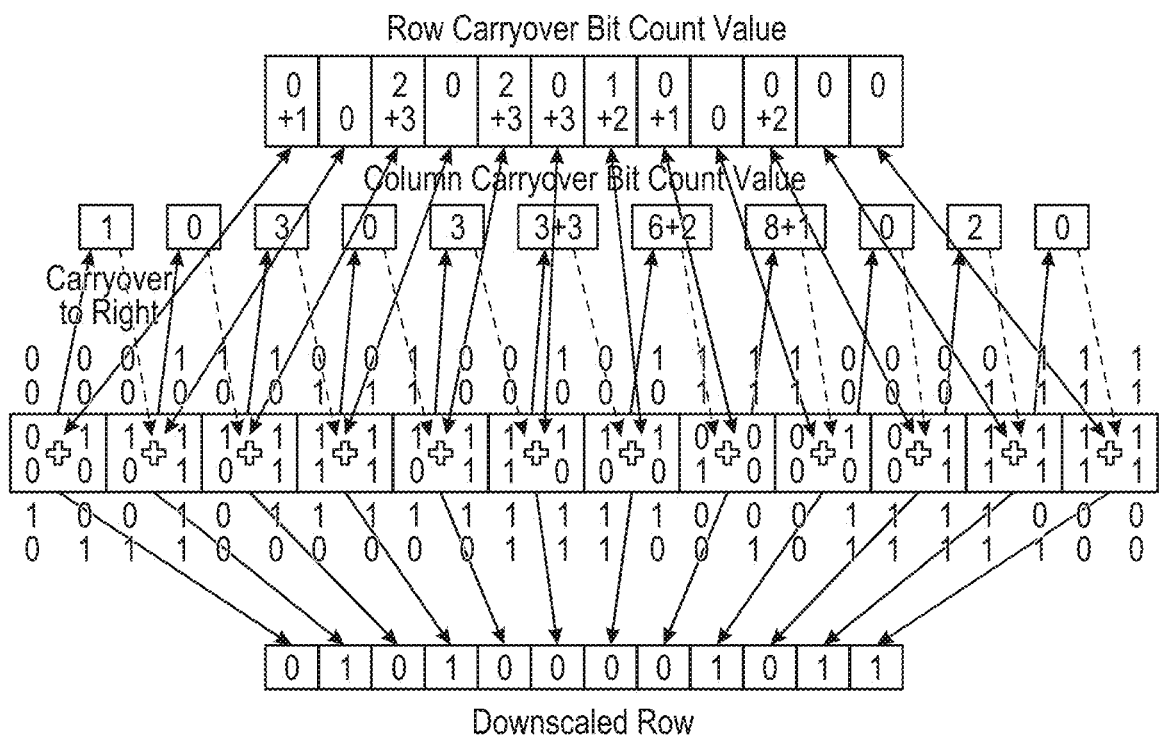
FIG. 18 is a diagrammatic view of the middle row of FIG. 17 illustrating computation of column carryover bit count values as affected by the row carryover bit count value from the previous row in accordance with embodiments of the subject technology.

Referring now to FIG. 18, a diagram illustrating generation of the column carryover bit count value carried over to adjacent regions is shown. The process implements a "column carryover bit count value" to be applied to the next region to the right of the application region. This value keeps track of the number of bits in a region that need to be carried over to the next region to the right. It contains a non-zero value only if the downscaled outcome from an application region is not an "ON" value.

Since a "column carryover bit count value" is computed when the process downscales a region stepping from left to right, this "column carryover bit count value" does not exist for the first column of regions in all rows of regions. In other words, the first column region in a row of regions only uses the "row carryover bit count value" from the previous row of regions and the application region, to determine the downscaled output. Once the "column carryover bit count value" is computed, it can be applied to the next region when stepping to the right in a pixel array.

The process, in the first column of regions, computes and generates both the "column carryover bit count value" and the "row carryover bit count value" during the binary downscale process. Only the "row carryover bit count value" is used in the downscale process for the first column of regions. The "column carryover bit count value" that is generated from the first column of regions will be applied to the next region to the right of the application region.

Figure 19:
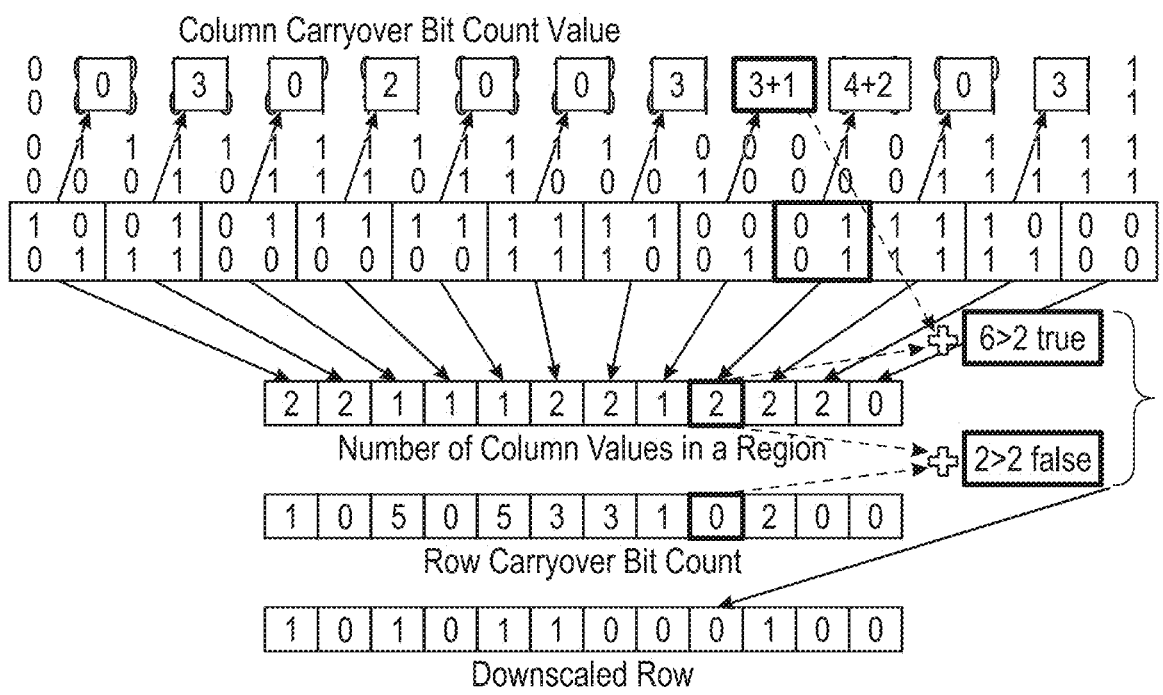
FIG. 19 is a diagrammatic view of the bottom row of FIG. 17 illustrating computation of number of column values in accordance with embodiments of the subject technology.

Referring now to FIG. 19, a diagram illustrating generation of the "number of column values" used in computing downscale values for regions is shown. The carryover binary downscale process uses the "number of column values" in a region in conjunction with the "column carryover bit count value" and the "row carryover bit count value" to convert the bits of an application region to a downscaled binary data bit.

The "number of column values" is another condition in the carryover binary downscale process used to produce the desired output from a printed document. It is used to enhance the quality of the downscaled output which is not covered by the number of bits alone in the application region.

The process steps through each row of the application region to determine the "number of column values". The sum of bits that are "ON" ("1") in a row is compared against a threshold value for that row. This comparison produces either a "1" or a "0" output for each row in the application region. The number of column values (num_col_values) is the sum of outputs from all rows in an application region. Since, the output from each row is "1" or a "0", the number of column values in a region cannot exceed the height of the region. As shown in FIG. 19 (and also in FIGS. 20-22), the application region is shown with a bolded border to highlight it as the region being processed for downscaling. The other boxes with a bolded border are associated with the processes used in determining the values for downscaling. The "number of column values" value is "2" since each row had a "1" value present. This value is used in the evaluation of Condition 2 (for example, as shown in steps 1110 and 1130 of FIG. 11). The "column carryover bit count value" is "4". When summed with the "number of column values" value, "2" the resultant value is "6" which is greater than the region height value, "2". So, the first part of Condition 2 is satisfied. The second part of Condition 2 checks whether the sum of "row carryover bit count value" and the "number of column values" (which is "2") is greater than the "region height value", which is "2". When "row carryover bit count value" of "0" is summed with the "number of column values" of "2" the resultant value is "2" which is not greater than the region height value, "2". So, the second part of Condition 2 is not satisfied. As described in FIG. 12, the downscale output value is thus "0", and bits may be carried over to the next application region for downscale processing.

Referring now to FIG. 23, an example of downscaled binary data output using the above described processes is shown. The array 2300 represents the downscaled outputs of the processing of binary data rows A, B, and C shown in FIG. 3A as each row was individually processed by the carryover methods illustrated in FIGS. 20, 21, and 22. As one may recall, the original input pixel array 300 (shown in FIG. 3) comprised 6 rows of 24 bits each row. The downscaling of array 300 by the embodiments discussed above results in an output of 3 rows of 12 bits of data in array 2300. The array 2300 represents the image data shown in section 270 of FIG. 2. As may be appreciated, the downscaled result retains substantial image quality yet for the resources used.

Figure 24:
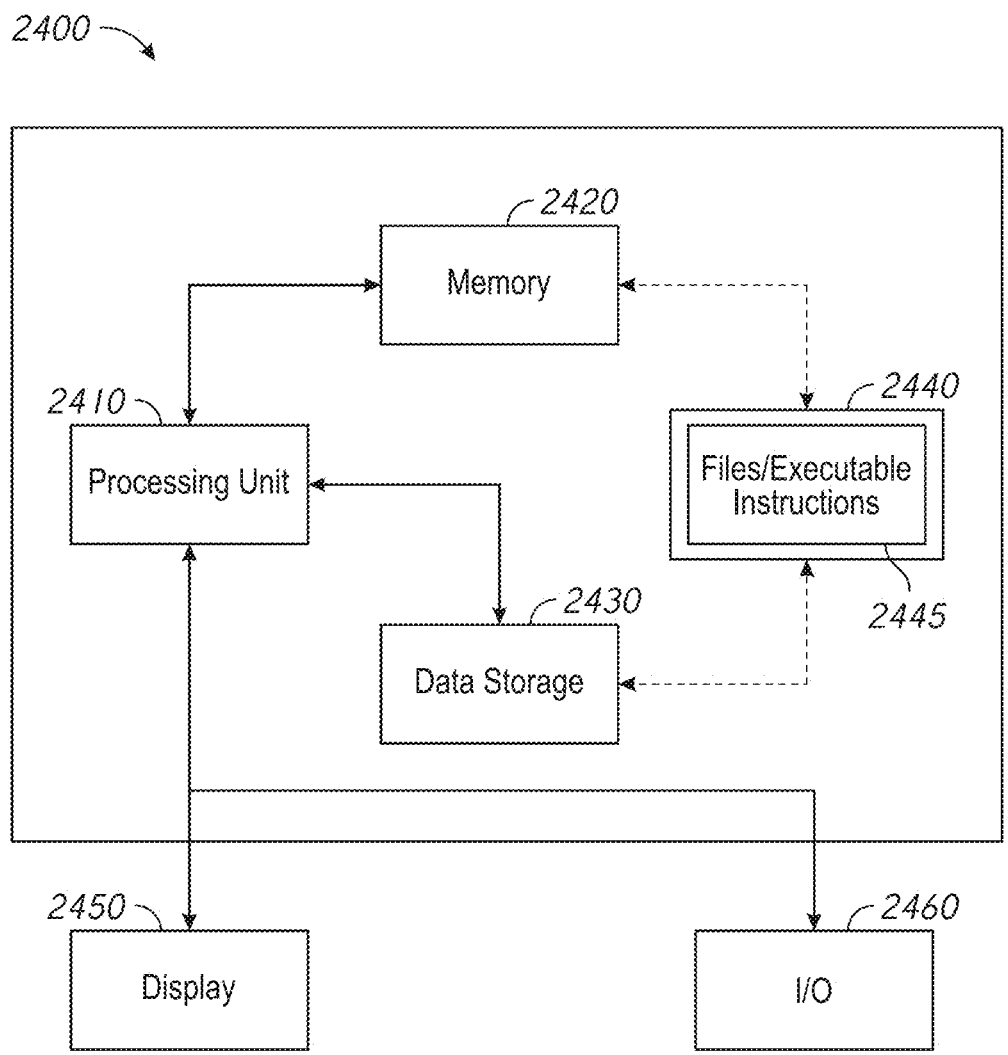
FIG. 24 is a block diagram of a computing device in accordance with an aspect of the subject technology.

Referring now to FIG. 24, a schematic of an example of a computing device 2400 is shown. The computing device 2400 may be for example, a computer system, a computer server, or a computing based image processing and printing device (for example a printer or multi-function printer (MFP). As will be appreciated, some aspects of the embodiments disclosed above may turn the computing device 2400 into a special purpose computer system that specifically processes images by downscaling them from an original image file. In some applications, printed documents may be downscaled by aspects of the disclosed embodiments so that the computing device 2400 is dedicated to printing out documents with reduced image data, which helps reduce network traffic and memory resources. For example, in an embodiment, a user may send an image to a printer. Embodiments may include a user selected scale factor sent with the image that may be used when rendering the image to downscale the image pixel density. Other embodiments may include one or more preset scale factors that may be stored in the printer's memory. The preset scale factors may be based on (and triggered) for example, the sheet size, print quality setting, print speed setting, or print profile setting.

In the role of a user device, the computing device 2400 is generally not a server but may instead be desktop computers, tablet or laptop computers, all-in-one computer stations, an image processing/rendering system (for example, a printer or MFP) with pre-programmed downscaling software, a mobile computing device (for example, a smart phone, smart wearable devices (glasses, jewelry, watches, ear wear, etc.)), or programmable electronics.

The components of the computing device 2400, may include, but are not limited to, one or more processors or processing units 2410, a system memory 2420, data storage 2430, a computer program product 2440 having a set of program modules 2445 including files and executable instructions, and a bus system that couples various system components including the system memory 2420 to the processor(s) 2410. In some embodiments, the processors 2410 may include a processing unit dedicated to graphics and image processing (for example a graphics processing unit (GPU) or visual processing unit (VPU). As a GPU or VPU, the processor 2410 may implement executable instructions focused on image processing applications (such as downscaling) either alone or in coordination with other general processor 2410 types such a CPUs, microchips, and the like.

The computing device 2400 may be described in the general context of computer system executable instructions, such as the program modules 2445 which represent a software embodiment of the system and processes described generally above. The program modules 2445 generally carry out the functions and/or methodologies of embodiments as described above.

The computing device 2400 may typically include a variety of computer system readable media. Such media could be chosen from any available media that is accessible by the computing device 2400, including non-transitory, volatile and non-volatile media, removable and non-removable media for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing. The system memory 2420 could include one or more computer system readable media in the form of volatile memory, such as a random-access memory (RAM) and/or a cache memory. By way of example only, the data storage system 2430 may read from and write to a non-removable, non-volatile magnetic media device. The system memory 2420 may include at least one program product 2440 to carry out the functions of embodiments of the invention in the form of computer executable instructions. The program product 2440, having a set of program modules 2445, may be stored in the system memory 2420 by way of example, and not limitation, as an operating system, one or more application programs, other program modules, and program data.

The computing device 2400 may communicate with one or more external devices including for example, an electronic display 2450 which may in some embodiments be configured for tactile response as in a touch screen display. User input into the display 2450 may be registered at the processor 2410 and processed accordingly. Other devices may enable the computing device 2400 to communicate with one or more other computing devices either by hardwire or wirelessly. Such communication can occur via Input/Output (I/O) interfaces/ports 2460. In some embodiments, the I/O interfaces/ports 2460 may be specially configured to handle aspects of the embodiments described herein converting the computing device 2400 into a special purpose machine.

The computing device 2400, through the I/O interface/ports 2460, may communicate with one or more networks such as a local area network (LAN), a general wide area network (WAN), and/or a public network (e.g., the Internet) via a network adapter as is commonly known in the art. Each of the operating system, one or more application programs, other program modules, and program data or some combination thereof, may include an implementation of a networking environment. In some embodiments, the computing device 2400 may be a cloud computing node connected to a cloud computing network (not shown). The computing device 2400 may be practiced in distributed cloud computing environments where tasks are performed by remote processing devices that are linked through a communications network. In a distributed cloud computing environment, program modules may be located in both local and remote computer system storage media including memory storage devices.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "module", "circuit", or "system." Furthermore, aspects of the disclosed invention may take the form of a computer program product embodied in one or more computer readable media having computer readable program code embodied thereon. In some embodiments, the output of the computer program product provides an electronic user interface on the display 2450 which may be controlled via direct contact with the display 2450 or via the I/O interfaces 2460 (which may be for example, interface devices such as keyboards, touchpads, a mouse, a stylus, or the like).

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 2410 of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks in the figures.

Those of skill in the art would appreciate that various components and blocks may be arranged differently (e.g., arranged in a different order, or partitioned in a different way) all without departing from the scope of the subject technology. The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

Thus, the claims are not intended to be limited to the aspects shown herein, but are to be accorded the full scope consistent with the language of claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method of downscaling image data for an array of pixels, comprising:
   receiving an input of pixel data representing an array of pixels, wherein the pixel data is in a binary format of bits divided into a plurality of regions based on a scale factor;
   computing a first carryover number of bits from a first carryover region positioned in a column to a left of a first application region;
   computing a second carryover number of bits from a second carryover region positioned in a row above the first application region;
   computing a first downscale value for the first application region based on bit values in the first application region, the first carryover number of bits in the first carryover region, and the second carryover number of bits in the second carryover region, wherein the first downscale value for the first application region is an "on" value when:
   the bit values in the first application region and the first carryover number of bits are greater than or equal to a solid pixel value for the first application region, and
   the bit values in the first application region and the second carryover number of bits are greater than or equal to the solid pixel value for the first application region, wherein the solid pixel value comprises each bit in the first application region being a "1" value; and
   outputting downscaled pixel data using the first downscale value as a downscaled image.

2. The method of claim 1, further comprising:
   determining whether the first downscale value for the first application region is an "off" value; and
   carrying over a cumulative number of bits from the first application region to a region to a right of the first application region and to a region below the first application region.

3. The method of claim 1, wherein the first carryover number of bits comprises an accumulation of bits in an application region with a "1" value carried over to a next column of application regions.

4. The method of claim 1, wherein the second carryover number of bits comprises an accumulation of bits in an application region with a "1" value carried over to a next row of application regions.

5. The method of claim 1, wherein the first downscale value for the first application region is an "on" value when:
   a number of column values in the first application region and the first carryover number of bits are greater than a height of the first application region, wherein:
   the number of column value is a sum of outputs from all rows of an application region being processed;
   the output of a row in the application region being processed depends on a threshold value of a row wherein
   the threshold value of the row comprises half the number of bits in the row being a "1" value;
   the height of the first application region is based on a number of rows in the first application region; and
   the number of column values in the first application region and the second carryover number of bits is greater than the height of the first application region.

6. The method of claim 1, wherein the first downscale value for the first application region is an "on" value when:
   the first application region is located in a first row of regions in the array of pixels; and
   the bit values in the first application region and the first carryover number of bits are greater than or equal to a solid pixel value for the first application region, wherein the solid pixel value comprises each bit in the first application region being a "1" value; or
   a number of column values in the first application region and the first carryover number of bits are greater than a height of the first application region, wherein:
   the number of column values is a sum of outputs from all rows of the first application region being processed;
   the output of a row in the first application region being processed depends on a threshold value of a row;
   the threshold value of a row comprises half the number of bits in a row being a "1" value; and
   the height of the first application region is based on a number of rows in the first application region.

7. The method of claim 1, wherein the first downscale value for the first application region is an "on" value when:
   the first application region is located in a first column of regions in the array of pixels; and the bit values in the first application region and the second carryover number of bits are greater than or equal to the solid pixel value for the first application region, wherein the solid pixel value comprises each bit in the first application region being a "1" value; or a number of column values in the first application region and the second carryover number of bits is greater than the height of the first application region, wherein the number of column values is a sum of outputs from all rows of the first application region being processed.

8. A non-transitory computer program product to downscale image data for an array of pixels, the computer program product comprising a non-transitory computer readable storage medium having computer readable program code embodied therewith, the computer readable program code being configured, when executed by a processor, to:

receive an input of pixel data representing an array of pixels, wherein the pixel data is in a binary format of bits divided into a plurality of regions based on a scale factor;

compute a first carryover number of bits from a first carryover region positioned in a column to a left of a first application region;

compute a second carryover number of bits from a second carryover region positioned in a row above the first application region;

compute a first downscale value for the first application region based on bit values in the first application region, the first carryover number of bits in the first carryover region, and the second carryover number of bits in the second carryover region, wherein the first downscale value for the first application region is an "on" value when:

the bit values in the first application region and the first carryover number of bits are greater than or equal to a solid pixel value for the first application region, and the bit values in the first application region and the second carryover number of bits are greater than or equal to the solid pixel value for the first application region, wherein the solid pixel value comprises each bit in the first application region being a "1" value; and output downscaled pixel data using the first downscale value as a downscaled image.

9. The non-transitory computer program product of claim 8, further comprising computer readable code configured to:

determine whether the first downscale value for the first application region is an "off" value; and carry over a cumulative number of bits from the first application region to a region to a right of the first application region and to a region below the first application region.

10. The non-transitory computer program product of claim 8, wherein the first carryover number of bits comprises an accumulation of bits in the application region with a "1" value carried over to a next column of application regions.

11. The non-transitory computer program product of claim 8, wherein the second carryover number of bits comprises an accumulation of bits in the application region with a "1" value carried over to a next row of application regions.

12. The non-transitory computer program product of claim 8, wherein the first downscale value for the first application region is an "on" value when:

a number of column values in the first application region and the first carryover number of bits are greater than a height of the first application region, wherein:

the number of columns value is a sum of outputs from all rows of an application region being processed;

the output of a row in the application region being processed depends on a threshold value of a row wherein the threshold value of the row comprises half the number of bits in the row being a "1" value;

the height of the first application region is based on a number of rows in the first application region; and the number of column values in the first application region and the second carryover number of bits is greater than the height of the first application region.

13. The non-transitory computer program product of claim 8, wherein the first downscale value for the first application region is an "on" value when:

the first application region is located in a first row of regions in the array of pixels; and the bit values in the first application region and the first carryover number of bits are greater than or equal to a solid pixel value for the first application region, wherein the solid pixel value comprises each bit in the first application region being a "1" value; or a number of column values in the first application region and the first carryover number of bits are greater than a height of the first application region, wherein:

the number of column values is a sum of outputs from all rows of the first application region being processed;

the output of a row in the first application region being processed depends on a threshold value of a row;

the threshold value of a row comprises half the number of bits in a row being a "1" value; and the height of the first application region is based on a number of rows in the first application region.

14. The non-transitory computer program product of claim 8, wherein the first downscale value for the first application region is an "on" value when:

the first application region is located in a first column of regions in the array of pixels; and the bit values in the first application region and the second carryover number of bits are greater than or equal to the solid pixel value for the first application region, wherein the solid pixel value comprises each bit in the first application region being a "1" value; or a number of column values in the first application region and the second carryover number of bits is greater than the height of the first application region, wherein the number of column values is a sum of outputs from all rows of the first application region being processed.

15. An image rendering computing device, comprising:
a memory module; and
a processor in communication with the memory module, the processor configured, via a set of executable instructions stored in the memory module, to:

receive an input of pixel data representing an array of pixels, wherein the pixel data is in a binary format of bits divided into a plurality of regions based on a scale factor;

compute a first carryover number of bits from a first carryover region positioned in a column to a left of a first application region;

compute a second carryover number of bits from a second carryover region positioned in a row above the first application region;

compute a first downscale value for the first application region based on bit values in the first application region, the first carryover number of bits in the first carryover region, and the second carryover number of bits in the second carryover region, wherein the first downscale value for the first application region is an "on" value when:
  the bit values in the first application region and the first carryover number of bits are greater than or equal to a solid pixel value for the first application region, and the bit values in the first application region and the second carryover number of bits are greater than or equal to the solid pixel value for the first application region, wherein the solid pixel value comprises each bit in the first application region being a "1" value; and
output downscaled pixel data using the first downscale value as a downscaled image.

16. The image rendering device of claim 15, wherein the processor is further configured to:
  determine whether the first downscale value for the first application region is an "off" value; and
  carry over a cumulative number of bits from the first application region to a region to the right of the first application region and to a region below the first application region.

17. The image rendering device of claim 15, wherein the first carryover number of bits comprises an accumulation of bits in the application region with a "1" value carried over to a next column of application regions.

18. The image rendering device of claim 15, wherein the second carryover number of bits comprises an accumulation of bits in the application region with a "1" value carried over to a next row of application regions.

* * * * *